June 12, 1962  H. EISMANN ETAL  3,038,380
ASYMMETRICAL PHOTOGRAPHIC OBJECTIVE
Filed Feb. 19, 1959
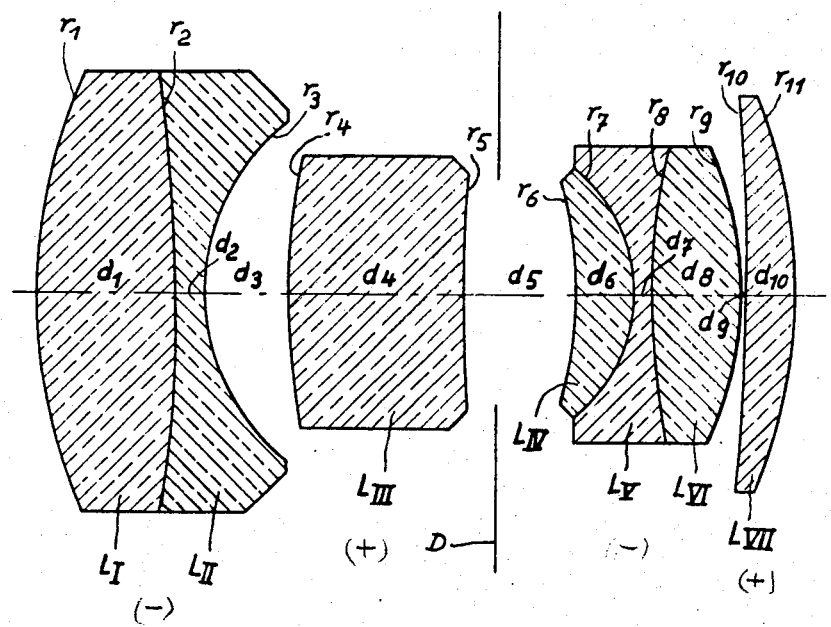

United States Patent Office 3,038,380
Patented June 12, 1962

3,038,380
ASYMMETRICAL PHOTOGRAPHIC OBJECTIVE
Helmut Eismann, Heidenheim (Brenz), and Günther Lange, Koenigsbronn, Germany, assignors to Carl Zeiss, Heidenheim (Brenz), Germany
Filed Feb. 19, 1959, Ser. No. 794,476
Claims priority, application Germany Feb. 27, 1958
1 Claim. (Cl. 88—57)

The objeect of the present invention is a wide-angle objective of relatively long focal intercept. A good compromise between the aberrations determining the image quality can be obtained if according to the invention the following conditions are satisfied:

(a) the front component nearest the object is a meniscus-shaped dispersive component which turns its concave side towards the diaphragm and is combined of two lenses of opposed refractive powers cemented together wherein the cemented surface turns its convex side towards the diaphragm;

(b) the component standing immediately in front of the diaphragm is a collective component;

(c) the component standing immediately behind the diaphragm is bent in the shape of a meniscus and turns its concave side towards the diaphragm;

(d) the last component is a meniscus-shaped collective component which turns its concave side towards the diaphragm;

(e) the axial separation between the front surface of the front component and the external surface turned away from the diaphragm of the component standing immediately behind the diaphragm is greater than the arithmetical mean of the absolute values of the radii of the said two surfaces wherein the said arithmetical mean lies within the limits $0.35f$ and $1.00f$ where $f$ is the focal length of the objective;

(f) the axial separation between the concave surface turned towards the diaphragm of the front component and the concave surface immediately following the diaphragm is greater than the arithmetical mean of the absolute values of the radii of the said two surfaces but smaller than three times the value of the said arithmetical means;

(g) the axial separation between the front surface of the front component and the surface standing immediately in front of the diaphragm is greater than the axial separation between the surface standing immediately behind the diaphragm and the last surface;

(h) the overall length of the objective lies within the limits $0.70 \cdot f$ and $2.00 \cdot f$.

In order to obtain good correction of the chromatic aberrations the component standing immediately behind the diaphragm is combined of three lenses cemented together wherein the middle lens has dispersive refractive power and the outer lenses cemented to it have collective refractive power each and wherein furthermore the $v$-value of the middle dispersive lens is smaller than the arithmetical mean of the $v$-values of the two outer lenses cemented to it.

In order to have a favourable effect on the coma of the oblique bundles the glass for the middle lens of the component standing immediately behind the diaphragm has the $n$-value greater than the arithmetical means of the $n$-values of the two lenses cemented to it.

In the attached drawing an objective according to the invention is represented in section. In the following table numerical data are given for one embodiment of such an objective.

In the illustration and in the table there are designated:

By $L$ the lenses,
By $r$ the radii,
By $d$ the axial separations of the lens surfaces,
By $n_d$ the refractive indices of the glasses for the $d$-line of the spectrum,
By $v$ the Abbe numbers of the glasses, and
By $D$ the diaphragm.

The data given are referred to a focal length of $f=1$. The aperture ratio amounts to 1:4. The useful angle of field has a value of $\pm 32°$. The focal intercept amounts to approximately 116% of the focal length.

| Lenses | Radii | Axial Separations | $n_d$ | $v$ |
|---|---|---|---|---|
| $L_I$ | $r_1 = +0.70887$ | $d_1 = 0.18589$ | 1.62041 | 60.3 |
| | $r_2 = -1.83258$ | | | |
| $L_{II}$ | | $d_2 = 0.03724$ | 1.50137 | 56.5 |
| | $r_3 = +0.28631$ | $d_3 = 0.11142$ | | |
| | $r_4 = +0.95897$ | | | |
| $L_{III}$ | | $d_4 = 0.23023$ | 1.75520 | 27.5 |
| | $r_5 = +2.37442$ | $d_5 = 0.15065$ | | |
| | $r_6 = -0.53539$ | | | |
| $L_{IV}$ | | $d_6 = 0.07447$ | 1.65160 | 58.4 |
| | $r_7 = -0.21315$ | | | |
| $L_V$ | | $d_7 = 0.02274$ | 1.72339 | 38.0 |
| | $r_8 = +0.95212$ | | | |
| $L_{VI}$ | | $d_8 = 0.12393$ | 1.66672 | 48.4 |
| | $r_9 = -0.42835$ | $d_9 = 0.00284$ | | |
| | $r_{10} = -3.01095$ | | | |
| $L_{VII}$ | | $d_{10} = 0.06196$ | 1.69067 | 54.9 |
| | $r_{11} = -0.68380$ | | | |

Back focal length $s' = 1.1613$.

We claim:

An asymmetrical photographic objective comprising at least four components separated by air spaces, the front component nearest the object being a meniscus-shaped dispersive component which turns its concave side towards the diaphragm and is combined from two lenses of opposed refractive powers cemented together the cemented surface therein turning its convex side towards the diaphragm, the component standing immediately in front of the diaphragm being a single collective lens, the member standing immediately behind the diaphragm being bent in the shape of a meniscus and turning its concave side towards the diaphragm and consisting of three lenses cemented together the middle lens of which having dispersive refractive power and the two outer lenses cemented to it having collective refractive power each and the $v$-value of the middle dispersive lens being smaller than the arithmetical mean of the $v$-values of the two outer lenses cemented to it, the $n$-value of the said middle lens being greater than the arithmetical mean of the $n$-values of the two lenses cemented to it, the last component being a meniscus-shaped collective component turning its concave side towards the diaphragm, the axial separation between the first surface and the external surface turned away from the diaphragm of the component standing immediately behind the diaphragm being greater than the arithmetical mean of the absolute values of the radii of the said two surfaces wherein the said arithmetical mean lies within the limits $0.35f$ and $1.00f$ where $f$ is the focal length of the objective, the axial separation between the concave surface turned towards the diaphragm of the front component and the concave surface immediately following the diaphragm being greater than the arithmetical mean of the absolute values of the radii of the said two surfaces but smaller than three times the value of the said arithmetical mean, the axial separation between the first surface and the surface standing immediately in front of the diaphragm being greater than the axial separation between the surface standing immediately behind the diaphragm and the last surface, and the overall length of the objective lying within the limits $0.70 \cdot f$ and $2.00 \cdot f$.

References Cited in the file of this patent

UNITED STATES PATENTS

| | | |
|---|---|---|
| 1,168,873 | Florian | Jan. 18, 1916 |
| 1,779,257 | Lee | Oct. 21, 1930 |
| 2,084,309 | Bertele | June 22, 1937 |
| 2,171,640 | Berek | Sept. 5, 1939 |
| 2,289,779 | Herzberger | July 14, 1942 |
| 2,341,385 | Kingslake et al. | Feb. 8, 1944 |
| 2,718,174 | Doi | Sept. 20, 1955 |
| 2,725,789 | Schlegel | Dec. 6, 1955 |
| 2,748,656 | Berger et al. | June 5, 1956 |
| 2,772,601 | Bertele | Dec. 4, 1956 |
| 2,849,918 | Eismann et al. | Sept. 2, 1958 |

FOREIGN PATENTS

| | | |
|---|---|---|
| 321,078 | Great Britain | Oct. 31, 1929 |
| 470,522 | Great Britain | Aug. 17, 1937 |
| 760,634 | Great Britain | Nov. 7, 1956 |
| 889,282 | France | Sept. 27, 1943 |